United States Patent
Chen

(10) Patent No.: US 7,610,571 B2
(45) Date of Patent: Oct. 27, 2009

(54) METHOD AND SYSTEM FOR SIMULATING STATE RETENTION OF AN RTL DESIGN

(75) Inventor: Yonghao Chen, Groton, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 134 days.

(21) Appl. No.: 11/489,384

(22) Filed: Jul. 18, 2006

(65) Prior Publication Data

US 2007/0245277 A1 Oct. 18, 2007

Related U.S. Application Data

(60) Provisional application No. 60/792,060, filed on Apr. 14, 2006.

(51) Int. Cl.
*G06F 17/50* (2006.01)

(52) U.S. Cl. ............................................. 716/5; 716/18

(58) Field of Classification Search ...................... 716/1, 716/2, 4–6
See application file for complete search history.

(56) References Cited

U.S. PATENT DOCUMENTS

| | | | |
|---|---|---|---|
| 6,289,498 B1 | 9/2001 | Dupenloup | |
| 6,779,163 B2 | 8/2004 | Bednar et al. | |
| 6,820,240 B2 | 11/2004 | Bednar et al. | |
| 6,883,152 B2 | 4/2005 | Bednar et al. | |
| 6,901,565 B2 * | 5/2005 | Sokolov | 716/4 |
| 7,080,341 B2 * | 7/2006 | Eisenstadt et al. | 716/13 |
| 7,216,326 B2 * | 5/2007 | Papanikolaou et al. | 716/14 |

* cited by examiner

*Primary Examiner*—Jack Chiang
*Assistant Examiner*—Binh C Tat
(74) *Attorney, Agent, or Firm*—Duane Morris LLP; Robert E. Scheid

(57) ABSTRACT

Method and system for simulating state retention of an RTL design are disclosed. The method includes receiving a netlist description of the circuit represented in a register-transfer-level (RTL) design environment, receiving power information specifications of the circuit, identifying one or more power domains of the circuit using the netlist description and the power information specifications, associating the one or more power domains and the power information specifications in the RTL design environment, where the one or more power domains are controlled by a set of power control signals through a power manager logic, and simulating state retention behavior in response to variations in power applied to the power domain.

32 Claims, 14 Drawing Sheets

| Time | Register | Port/Net |
|---|---|---|
| 0 | val=000001 | w=000001 |
| 10 | val=000011 | w=000011 |
| 20 | val=000100 | w=000100 |
| 30 | val=000110 | w=000110 |
| 40 | val=000111 | w=000111 |
| 50 | val=001001 | w=001001 |
| 60 | val=001010 | w=001010 |
| 70 | val=001100 | w=001100 |
| 80 | val=001101 | w=001101 |
| 90 | val=001111 | w=001111 |
| 100 | val=010000 | w=010000 |
| 110 | val=010010 | w=010010 |
| 120 | val=010011 | w=010011 |
| 130 | val=010101 | w=010101 |
| 140 | val=010110 | w=010110 |
| 150 | val=011000 | w=011000 |
| 160 | val=011001 | w=011001 |
| 170 | val=011011 | w=011011 |
| 180 | val=011100 | w=011100 |
| 190 | val=011110 | w=011110 |
| 200 | val=011111 | w=011111 |

FIG. 2C

| Time | Power Control Signal | Register | Port/Net |
|---|---|---|---|
| 0 | ice=0 | val=000001 | w=000001 |
| 10 | ice=0 | val=000011 | w=000011 |
| 20 | ice=0 | val=000100 | w=000100 |
| 25 | ice=1 | val=000100 | w=111111 |
| 30 | ice=1 | val=000110 | w=111111 |
| 40 | ice=1 | val=000111 | w=111111 |
| 50 | ice=1 | val=001001 | w=111111 |
| 60 | ice=1 | val=001010 | w=111111 |
| 70 | ice=1 | val=001100 | w=111111 |
| 77 | ice=0 | val=001100 | w=001100 |
| 80 | ice=0 | val=001101 | w=001101 |
| 90 | ice=0 | val=001111 | w=001111 |
| 100 | ice=0 | val=010000 | w=010000 |
| 110 | ice=0 | val=010010 | w=010010 |
| 120 | ice=0 | val=010011 | w=010011 |
| 125 | ice=1 | val=010011 | w=111111 |
| 130 | ice=1 | val=010101 | w=111111 |
| 140 | ice=1 | val=010110 | w=111111 |
| 150 | ice=1 | val=011000 | w=111111 |
| 153 | ice=0 | val=011000 | w=011000 |
| 160 | ice=0 | val=011001 | w=011001 |
| 170 | ice=0 | val=011011 | w=011011 |
| 180 | ice=0 | val=011100 | w=011100 |
| 190 | ice=0 | val=011110 | w=011110 |
| 200 | ice=0 | val=011111 | w=011111 |

FIG. 3B

| Time | Power Control Signal | Register | Port/Net |
|---|---|---|---|
| 0 | pge=0 | val=000001 | w=000001 |
| 10 | pge=0 | val=000011 | w=000011 |
| 20 | pge=0 | val=000100 | w=000100 |
| 26 | pge=1 | val=000100 | w=000100 |
| 30 | pge=1 | val=000110 | w=000110 |
| 40 | pge=1 | val=000111 | w=000111 |
| 50 | pge=1 | val=001001 | w=001001 |
| 60 | pge=1 | val=001010 | w=001010 |
| 70 | pge=1 | val=001100 | w=001100 |
| 76 | pge=0 | val=000100 | w=000100 |
| 80 | pge=0 | val=000101 | w=000101 |
| 90 | pge=0 | val=000111 | w=000111 |
| 100 | pge=0 | val=001000 | w=001000 |
| 110 | pge=0 | val=001010 | w=001010 |
| 120 | pge=0 | val=001011 | w=001011 |
| 126 | pge=1 | val=001011 | w=001011 |
| 130 | pge=1 | val=001101 | w=001101 |
| 140 | pge=1 | val=001110 | w=001110 |
| 150 | pge=1 | val=010000 | w=010000 |
| 152 | pge=0 | val=001011 | w=001011 |
| 160 | pge=0 | val=001100 | w=001100 |
| 170 | pge=0 | val=001110 | w=001110 |
| 180 | pge=0 | val=001111 | w=001111 |
| 190 | pge=0 | val=010001 | w=010001 |
| 200 | pge=0 | val=010010 | w=010010 |

FIG. 4B

| Time | Power Control Signal | Register | Port/Net |
|---|---|---|---|
| 0 | pse=1 | val=000001 | w=000001 |
| 10 | pse=1 | val=000011 | w=000011 |
| 20 | pse=1 | val=000100 | w=000100 |
| 27 | pse=0 | val=xxxxxx | w=xxxxxx |
| 75 | pse=1 | val=xxxxxx | w=xxxxxx |
| 127 | pse=0 | val=xxxxxx | w=xxxxxx |
| 151 | pse=1 | val=xxxxxx | w=xxxxxx |
| 200 | pse=1 | val=xxxxxx | w=xxxxxx |

FIG. 5B

| Time | Power Control Signals | | Register | Port/Net |
|---|---|---|---|---|
| 0 | pse=1 | ice=0 | val=000001 | w=000001 |
| 10 | pse=1 | ice=0 | val=000011 | w=000011 |
| 20 | pse=1 | ice=0 | val=000100 | w=000100 |
| 25 | pse=1 | ice=1 | val=000100 | w=111111 |
| 27 | pse=0 | ice=1 | val=xxxxxx | w=111111 |
| 75 | pse=1 | ice=1 | val=xxxxxx | w=111111 |
| 77 | pse=1 | ice=0 | val=xxxxxx | w=xxxxxx |
| 125 | pse=1 | ice=1 | val=xxxxxx | w=111111 |
| 127 | pse=0 | ice=1 | val=xxxxxx | w=111111 |
| 151 | pse=1 | ice=1 | val=xxxxxx | w=111111 |
| 153 | pse=1 | ice=0 | val=xxxxxx | w=xxxxxx |
| 200 | pse=1 | ice=0 | val=xxxxxx | w=xxxxxx |

FIG. 6A

| Time | Power Control Signals | | Register | Port/Net |
|---|---|---|---|---|
| 0 | pse=1 | pge=0 | val=000001 | w=000001 |
| 10 | pse=1 | pge=0 | val=000011 | w=000011 |
| 20 | pse=1 | pge=0 | val=000100 | w=000100 |
| 26 | pse=1 | pge=1 | val=000100 | w=000100 |
| 27 | pse=0 | pge=1 | val=xxxxxx | w=xxxxxx |
| 75 | pse=1 | pge=1 | val=xxxxxx | w=xxxxxx |
| 76 | pse=1 | pge=0 | val=000100 | w=000100 |
| 80 | pse=1 | pge=0 | val=000101 | w=000101 |
| 90 | pse=1 | pge=0 | val=000111 | w=000111 |
| 100 | pse=1 | pge=0 | val=001000 | w=001000 |
| 110 | pse=1 | pge=0 | val=001010 | w=001010 |
| 120 | pse=1 | pge=0 | val=001011 | w=001011 |
| 126 | pse=1 | pge=1 | val=001011 | w=001011 |
| 127 | pse=0 | pge=1 | val=xxxxxx | w=xxxxxx |
| 151 | pse=1 | pge=1 | val=xxxxxx | w=xxxxxx |
| 152 | pse=1 | pge=0 | val=001011 | w=001011 |
| 160 | pse=1 | pge=0 | val=001100 | w=001100 |
| 170 | pse=1 | pge=0 | val=001110 | w=001110 |
| 180 | pse=1 | pge=0 | val=001111 | w=001111 |
| 190 | pse=1 | pge=0 | val=010001 | w=010001 |
| 200 | pse=1 | pge=0 | val=010010 | w=010010 |

FIG. 6B

| Time | Power Control Signals | | | Register | Port/Net |
|---|---|---|---|---|---|
| 0 | pse=1 | pge=0 | ice=0 | val=000001 | w=000001 |
| 10 | pse=1 | pge=0 | ice=0 | val=000011 | w=000011 |
| 20 | pse=1 | pge=0 | ice=0 | val=000100 | w=000100 |
| 25 | pse=1 | pge=0 | ice=1 | val=000100 | w=111111 |
| 26 | pse=1 | pge=1 | ice=1 | val=000100 | w=111111 |
| 27 | pse=0 | pge=1 | ice=1 | val=xxxxxx | w=111111 |
| 75 | pse=1 | pge=1 | ice=1 | val=xxxxxx | w=111111 |
| 76 | pse=1 | pge=0 | ice=1 | val=000100 | w=111111 |
| 77 | pse=1 | pge=0 | ice=0 | val=000100 | w=000100 |
| 80 | pse=1 | pge=0 | ice=0 | val=000101 | w=000101 |
| 90 | pse=1 | pge=0 | ice=0 | val=000111 | w=000111 |
| 100 | pse=1 | pge=0 | ice=0 | val=001000 | w=001000 |
| 110 | pse=1 | pge=0 | ice=0 | val=001010 | w=001010 |
| 120 | pse=1 | pge=0 | ice=0 | val=001011 | w=001011 |
| 125 | pse=1 | pge=0 | ice=1 | val=001011 | w=111111 |
| 126 | pse=1 | pge=1 | ice=1 | val=001011 | w=111111 |
| 127 | pse=0 | pge=1 | ice=1 | val=xxxxxx | w=111111 |
| 151 | pse=1 | pge=1 | ice=1 | val=xxxxxx | w=111111 |
| 152 | pse=1 | pge=0 | ice=1 | val=001011 | w=111111 |
| 153 | pse=1 | pge=0 | ice=0 | val=001011 | w=001011 |
| 160 | pse=1 | pge=0 | ice=0 | val=001100 | w=001100 |
| 170 | pse=1 | pge=0 | ice=0 | val=001110 | w=001110 |
| 180 | pse=1 | pge=0 | ice=0 | val=001111 | w=001111 |
| 190 | pse=1 | pge=0 | ice=0 | val=010001 | w=010001 |
| 200 | pse=1 | pge=0 | ice=0 | val=010010 | w=010010 |

FIG. 6C

METHOD AND SYSTEM FOR SIMULATING STATE RETENTION OF AN RTL DESIGN

REFERENCE TO RELATED APPLICATIONS

This application claims the benefit of application No. 60/792,060, "Method and Mechanism for Implementing Electronic Designs Having Power Information Specifications," filed Apr. 14, 2006, which is incorporated herein in its entirety by reference. This application also incorporates by reference in its entirety U.S. application Ser. No. 11/489,385, "Simulation of Power Domain Isolation", filed concurrently herewith.

FIELD OF THE INVENTION

The present invention relates to the field of electronic design automation (EDA) tools. In particular, the present invention relates to a method and system for simulating isolation of a power domain among a plurality of power domains using a hierarchical register-transfer-level (RTL) representation of an integrated circuit.

BACKGROUND OF THE INVENTION

With the rapid growth of wireless and portable consumer electronic devices, there have been increasing demands for new technological advancements with more and more functionalities being crammed into battery-operated devices. This phenomenon has resulted in increasing design and verification challenges for low-power applications.

The challenges include minimizing leakage power dissipation, designing efficient packaging and cooling systems for high-power integrated circuits, verifying functionalities of low-power or no power situations early in the design. Such power management issues become even more critical in view of the continuous shrinking of device dimensions with the next generation of semiconductor processing technology. Addressing such power management issues is critical in the integrated circuit design flow for portable consumer electronic devices.

Existing power optimization and implementation techniques are typically applied at the physical implementation phase of the design process. Certain power management techniques can only be implemented at the physical level after circuit synthesis. These power techniques can only be implemented at the physical level after circuit synthesis. These power management design techniques may significantly change the design intent, yet none of the intended behavior can be captured in the RTL of the design. This deficiency creates a gap in the RTL to Graphic Data System II (GDSII) implementation and verification flow where the original RTL can no longer be relied upon as a correct representation of the design, and thus cannot be used to verify the final netlist implementation containing power management implementations.

Therefore, there is a need for incorporating power information of the circuit to address the deficiencies of the existing design methodologies early on in the design process. Specifically, there is a need for incorporating power information in the early design cycles and applying the power information to the entire design flow of verification, validation, synthesis, test, physical synthesis, routing, analysis and signoff tool. In particular, there is a need to ensure proper state retention and state loss behavior of a power domain in an RTL design environment.

SUMMARY

In one embodiment, a method for simulating a circuit includes receiving a netlist description of the circuit represented in a register-transfer-level (RTL) design environment, receiving power information specifications of the circuit, identifying one or more power domains of the circuit using the netlist description and the power information specifications, associating the one or more power domains and the power information specifications in the RTL design environment, where the one or more power domains are controlled by a set of power control signals through a power manager logic, and simulating state retention behavior in response to variations in power applied to the power domain.

In another embodiment, a computer program product for simulating a circuit includes a medium storing computer programs for execution by one or more computer systems having at least a processing unit, a user interface, and a memory. The computer program product further includes code for receiving a netlist description of the circuit represented in a register-transfer-level (RTL) design environment, code for receiving power information specifications of the circuit, code for identifying one or more power domains of the circuit using the netlist description and the power information specifications, code for associating the one or more power domains and the power information specifications in the RTL design environment, where the one or more power domains are controlled by a set of power control signals through a power manager logic, and code for simulating state retention behavior in response to variations in power applied to the power domain.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 2C illustrates a simulation result without cell isolation or state retention during a period when power is applied to the register of FIG. 2B.

FIG. 3B illustrates a simulation result of the register of FIG. 2B with cell isolation in a power-down process according to an embodiment of the present invention.

FIG. 4B illustrates another simulation result of the register of FIG. 2B with state retention according to an embodiment of the present invention.

FIG. 5B illustrates yet another simulation result of the register of FIG. 2B with state loss according to an embodiment of the present invention.

FIG. 6A illustrates yet another simulation result of the register of FIG. 2B with cell isolation according to an embodiment of the present invention.

FIG. 6B illustrates another simulation result of the register of FIG. 2B with state retention capability enabled according to an embodiment of the present invention.

FIG. 6C illustrates yet another simulation result of the register of FIG. 2B with cell isolation and state retention capability enabled according to an embodiment of the present invention.

DESCRIPTION OF EMBODIMENTS

Methods and systems are provided for simulating state retention of a power domain using a hierarchical RTL representation of an integrated circuit. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
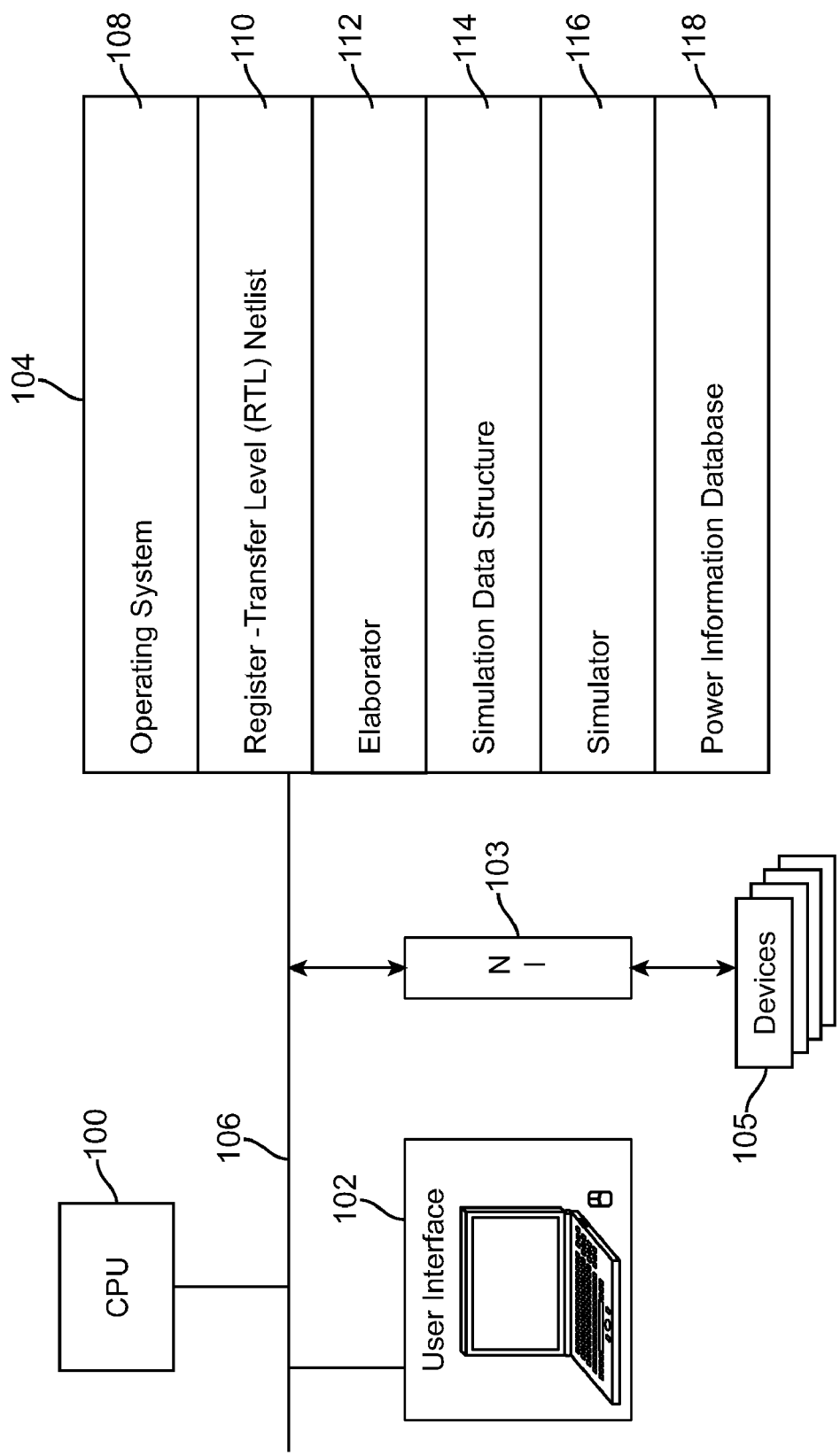
FIG. 1A illustrates a system for simulating an integrated circuit according to an embodiment of the present invention.

In one embodiment, a system for simulating an integrated circuit is implemented using a computer system as shown in FIG. 1A. The computer system includes one or more central processing units (CPUs) 100, at least a user interface 102, a memory device 104, a system bus 106, and one or more bus interfaces for connecting the CPU, user interface, memory device, and system bus together. The computer system also includes at least one network interface 103 for communicating with other devices 105 on a computer network. In alternative embodiments, much of the functionality of the circuit simulator may be implemented in one or more application-specific integrated circuits or field-programmable gate arrays, thereby either eliminating the need for a CPU, or reducing the role of the CPU in simulating the integrated circuit.

The memory device 104 may include a high-speed random access memory or may also include a non-volatile memory, such as one or more magnetic disk storage devices. The memory device 104 may also include mass storages that are remotely located from the central processing unit(s) 100. The memory device 104 preferably stores:

- an operating system 108 that includes procedures for handling various basic system services and for performing hardware-dependent tasks;
- a register-transfer-level (RTL) netlist 10 describing the integrated circuit to be simulated;
- a circuit elaborator 112 for compiling the RTL netlist 110 to form a hierarchical simulation data structure;
- a hierarchical simulation data structure 114 that represents a data structure of the integrated circuit design to be simulated;
- a power information database 118; and
- a circuit simulator 116 that simulates the integrated circuit represented by the simulation data structure 114 with power information specifications provided by the power information database 118.

Note that the circuit elaborator also instantiates circuit components, connects the circuit components, and sets up run-time simulation elements of the integrated circuit design. In addition, the hierarchical simulation data structure represents the integrated circuit design as a hierarchically arranged set of branches, including a root branch and a plurality of other branches logically organized in a graph. The hierarchically arranged set of branches includes a first branch that includes one or more circuit elements and a second branch that includes one or more circuit elements where the first branch and second branch are interconnected in the graph through a third branch at a higher hierarchical level in the graph than the first and second branches. Also note that an RTL netlist description of an integrated circuit may be written in either the Verilog or VHDL design language.

The circuit elaborator, simulation data structure, circuit simulator, power information database, and the RTL netlist may include executable procedures, sub-modules, tables, and other data structures. In other embodiments, additional or different modules and data structures may be used, and some of the modules and/or data structures listed above may not be used.

Figure 1B:
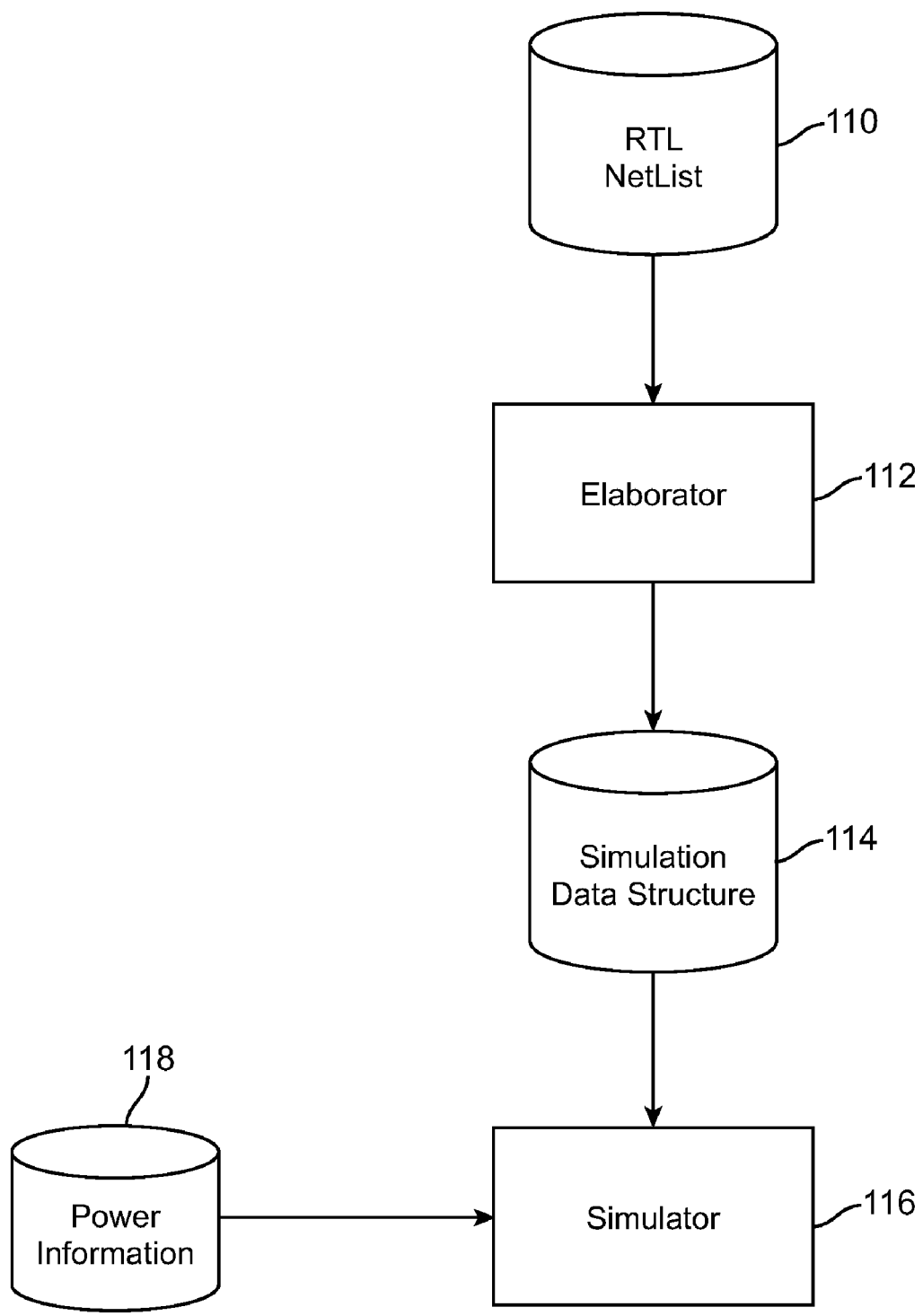
FIG. 1B illustrates a method for simulating a circuit using power information specifications according to an embodiment of the present invention.

FIG. 1B illustrates a method for simulating a circuit using power information specifications according to an embodiment of the present invention. As shown in FIG. 1B, the circuit may be represented as an RTL netlist 110. The RTL netlist then passes through a circuit elaborator 112 to form a simulation data structure 114. In block 116, the simulation data structure 114 and power information of the circuit 118 are used by a simulator 116 to simulate the circuit.

In the present invention, since the design intent, power constraint, and/or technology library information are embedded within the CPF file, such as verification and sign-off processing are possible even at the functional stage. In fact, the information can be used throughout the entire EDA tool flow to more efficiently and effectively allow designer to design, verify, and physically implement the low-power design.

In an exemplary implementation of CPF, "CPF objects" refer to objects that are being defined (named) in the CPF file. The following are examples of CPF objects that used in CPF according to some embodiments of the invention:

Analysis View: A view that associates a delay calculation corner with a constraint mode. The set of active views represent the different design variations that will be timed and optimized.

Constraint Mode: A mode that defines one of possibly many different functional, or test behaviors of a design. A constraint mode is defined through clock definitions, constants, or exceptions.

Figure 2A:
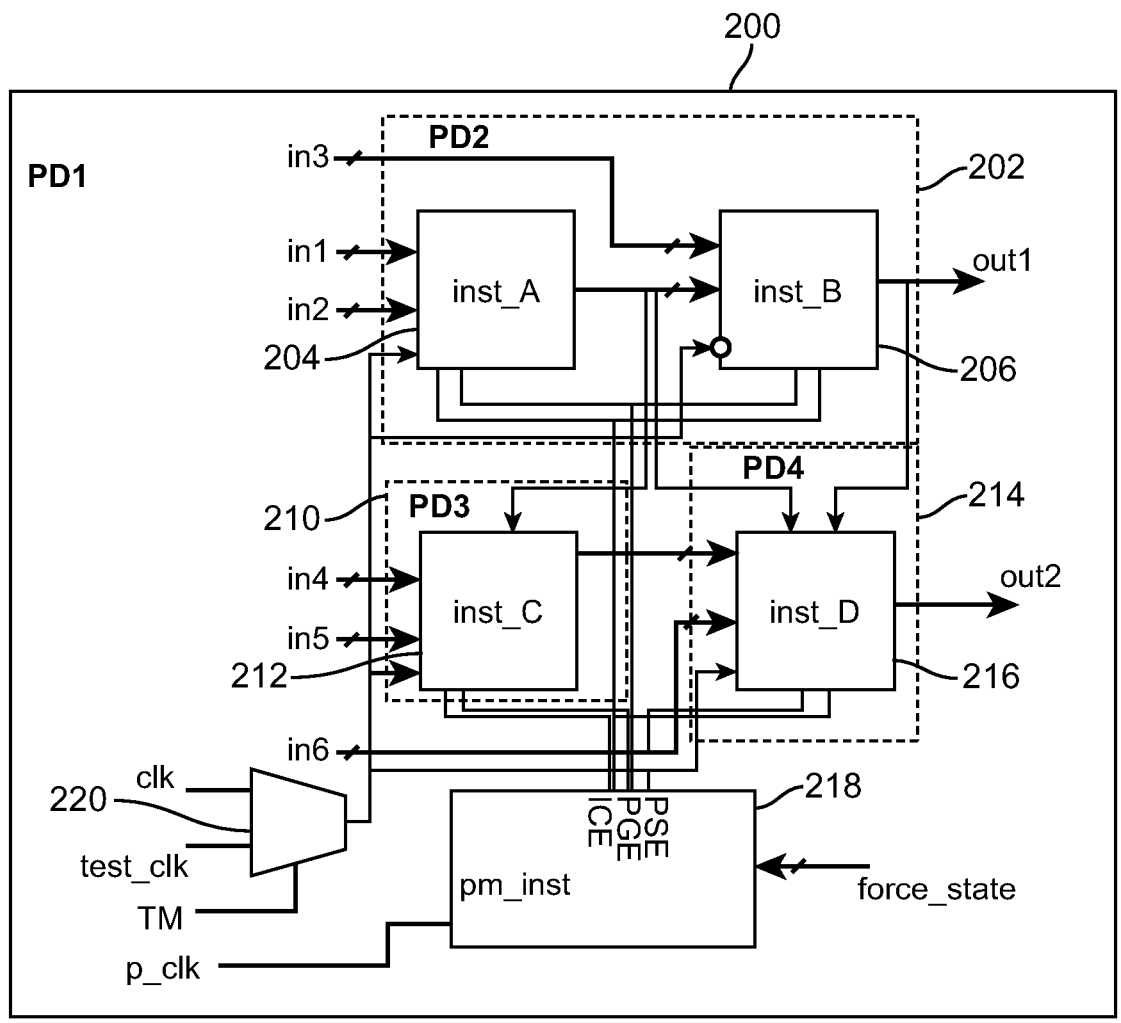
FIG. 2A illustrates an example design incorporating power information according to an embodiment of the present invention.

Delay Calculation Corner: References all information to calculate the delays for a specific condition of the design.
Library Set: A set (collection) of libraries. By giving the set a name, it is easy to reference the set when defining delay calculation corners. The same library set can be referenced multiple times by different delay calculation corners.
Operating Condition: A condition determined through a specific set of process, voltage and temperature values under which the design must be able to perform.
Power Domain: A collection of logic blocks (hierarchical instances) and leaf instances that use the same power supply during normal operation, and that can be powered on or off at the same time for an operation. Power domains follow the logic hierarchy. They can be nested within another power domain. A virtual domain is a power domain inside an IP instance. It can only be associated with a list of IO ports of the IP block. In some embodiments, one cannot declare instances that belong to different logic hierarchies to be part of the same power domain.
Power Mode: A static state of a design that indicates the ON and OFF status of each power domain.
In some embodiments, the technology information includes special library cells for power management. The following are examples of library cells that can be used in some embodiments of the invention:
Always-on Cell: A special buffer or latch or flip-flop located in a powered down domain, and whose power supply is continuously on even when the power supply for the rest of the logic in the power domain is off.
Isolation Cell Logic used to isolate signals between two power domains where one is powered on and one is powered down. The most common usage of such cell is to isolate signals originating in a power domain that is being powered down, from the power domain that receives these signals and that remains powered on.
Level Shifter Cell: Logic to pass data signals between power domains operating at different voltages.
Power Switch Cell: Logic used to disconnect the power supply from all the gates in a power domain.
State Retention Cell: Special flip-flop or latch used to retain the state of the cell when its main power supply is shut off.
In some embodiments, CPF can be implemented hierarchically. For example, many design teams can contribute to different blocks in the design. These blocks, whether they are soft blocks or hard blocks (such as IP instances, where the internal details of the block are unknown) can each have their own CPF file.
FIG. 2A illustrates an example design incorporating power information according to an embodiment of the present invention. The example design 200 includes four logic instances inst_A 204, inst_B 206, inst_C 212, and inst_D 216, a power manager instance pm_inst 218, and a clock gating logic 220. Each design instance includes a set of input and output signals. The clock gating logic 220 receives inputs clk and test_clk, and a control signal TM. The output of the clock gating logic controls the gating of the clocks to instances inst_A 204, inst_B 206, inst_C 212, and inst_D 216, respectively.
As shown in FIG. 2A, the example design includes four power domains. The top-level design (also referred to as top design) and the power manager instance pm_inst 218 belong to the default power domain PD1 200. Instances inst_A 204 and inst_B 206 belong to the power domain PD2 202. Instance inst_C 212 belongs to power domain PD3 210. Instance inst_D 216 belongs to power domain PD4 214. Table 1 shows the static behavior of the four domains according to embodiments of the present invention.

TABLE 1

| Power Domain | Power Mode | | | |
| --- | --- | --- | --- | --- |
| | PM1 | PM2 | PM3 | PM4 |
| PD1 | ON | ON | ON | ON |
| PD2 | ON | OFF | OFF | OFF |
| PD3 | ON | ON | OFF | OFF |
| PD4 | ON | ON | ON | OFF |

The power manager instance (pm_inst) 218 generates three sets of control signals, namely pse_enable, pge_enable, and ice_enable, to control each power domain. Table 2 shows control signals of the power manager instance pm_inst 218 for controlling the four power domains according to embodiments of the present invention.

TABLE 2

| Power Domain | Power Control Signals | | |
| --- | --- | --- | --- |
| | power switch enable (PSE) | isolation cell enable (ICE) | power gating enable (PGE) |
| PD1 | no control signal | no control signal | no control signal |
| PD2 | pse_enable[0] | ice_enable[0] | pge_enable[0] |
| PD3 | pse_enable[1] | ice_enable[1] | pge_enable[1] |
| PD4 | pse_enable[2] | ice_enable[2] | pge_enable[2] |

The following is an example netlist of a CPF file of the top design according to an embodiment of the present invention.

```
# Define top design
set_top_design top
# Set up logic structure for all power domains
create_power_domain -name PD1 -default
create_power_domain -name PD2 -instances {inst_A inst_B} \
 -shutoff_condition {pm_inst.pse_enable[0]}
create_power_domain -name PD3 -instances inst_C \
 -shutoff_condition {pm_inst.pse_enable[1]}
create_power_domain -name PD4 -instances inst_D \
 -shutoff_condition {pm_inst.pse_enable[2]}
# Define static behavior of all power domains and specify timing
constraints
create_power_mode -name PM1 -sdc_files ../SCRIPTS/cm1.sdc \
 -activity_file ../SIM/top_1.tcf
create_power_mode -name PM2 -off_domains PD2 -sdc_files ../
 SCRIPTS/cm2.sdc
create_power_mode -name PM3 -off_domains {PD2 PD3}
create_power_mode -name PM4 -off_domains {PD2 PD3 PD4}
# Set up required isolation and state retention logic of all domains
create_state_retention_logic -restore_edge {pm_inst.pge_enable[0]} \
 -instances inst_A.reg_bank_1.out
create_state_retention_logic -power_domain PD3 -restore_edge \
 {pm_inst.pge_enable[1]}
create_state_retention_logic -power_domain PD4 -restore_edge \
 {pm_inst.pge_enable[2]}
create_isolation_logic -from PD2 -isolation_condition \
 {pm_inst.ice_enable[0]} -isolation_output high
create_isolation_logic -from PD3 -isolation_condition \
 {pm_inst.ice_enable[1]}
create_isolation_logic -from PD4 -isolation_condition \
 {pm_inst.ice_enable[2]}
```

According to embodiments of the present invention, the following commands are used to simulate isolation and/or state retention of a power domain using a hierarchical RTL data structure.
The create_isolation_logic command is used to add isolation cells for certain designer-specified power domains. This command allows a designer to specify which pins are to be isolated by 1) specifying all pins to be isolated with the -pins option; 2) selecting only output pins in the power domains listed with the -from option; 3) selecting only input pins in the power domains listed with the -to option; and 4) combining options to filter the set of pins. Specifically, a designer may 1) combine -pins and -from options to isolate those pins in the designer-specified list that are also output pins in a power domain listed with the -from option; 2) combine -pins and -to options to isolate those pins in the designer-specified list that are also input pins in a power domain listed with the -to option; 3) combine -from and -to options to isolate input pins that belong to a power domain listed with the -to option but that are also driven by a net coming from a power domain listed with the -from option; 4) combine -pins, -from and -to options to isolate those input pins in the designer-specified list that belong to a power domain listed with the -to option but that are also driven by a net coming from a power domain listed with the -from option; and 5) exclude certain pins with the -exclude option. An example use of the create_isolation_logic command is shown below.

```
create_isolation_logic
-isolation_condition expression
{-pins pin_list | -from power_domain_list | -to power_domain_list}...
[-exclude pin_list] [-location {from | to} ]
[-isolation_output {high|low|hold}]
[-cells cell_list] [-prefix string]
```

The options and their corresponding arguments of the create_isolation_logic command are shown as follows according to an embodiment of the present invention.

-cells cell_list: This option and its argument specify the names of the library cells that are used as isolation cells for the selected pins. By default, the appropriate isolation cells are chosen from the isolation cells defined with the define_isolation_cell command or from the library cells with isolation related .lib attributes.

-exclude pin_list: This option and its argument specify a list of pins that do not require isolation logic.

-from power_domain_list: This option and its argument limit the pins to be considered for isolation to output pins in the specified power domains. If specified with -to option, all input pins in the -to domains that are receiving signals from the -from domains will be isolated. The power domains are previously defined with the create_power_domain command.

-isolation_condition expression: This option and its argument specify a condition when the specified pins should be isolated. This condition is a function of pins.

-isolation_output {high|low|hold}: This option and its argument control and generate the output value at the output of the isolation logic in response to certain isolation condition being met. The output can be high, low, or held to the value it has right before the isolation condition is activated.

-location {from|to}: This option and its argument specify the power domain to which the isolation logic is added. The from argument stores the isolation logic with the instances of the originating power domain, and the to argument stores the isolation logic with the instances of the destination power domain. The default argument is to.

-pins pin_list: This option and its argument specify a list of pins to be isolated. The designer may list input pins and output pins of power domains. The designer may further limit the pins to be isolated using the -from, -to, and -exclude options.

-prefix string: This option and argument specify the prefix to be used when creating the create_isolation_logic.

-to power_domain_list: This option and its argument limit the pins to be considered for isolation to input pins in the specified power domains. The power domains are previously defined with the create_power_domain command.

The create_power_domain command creates a power domain and specifies the instances and top-level ports that belong to this power domain. By default, an instance inherits the power domain setting from its parent hierarchical instance or design, unless that instance is associated with a specific power domain. In CPF, power domains are associated with the design objects based on the logical hierarchy. The order in which a designer creates the power domains is irrelevant. Note that a designer can define at least two power domains for a design, and only one power domain can be the default power domain. In addition, the create_power_domain command specifies the -power_switchable_nets and -ground_switchable_nets options if the designer wants to use the CPF file as a golden constraint file throughout the entire flow from design creation until design implementation and signoff. An example use of the create_power_domain command is shown below.

```
create_power_domain
    -name power_domain
    { -default [-instances instance_list]
    | -instances instance_list [-boundary_ports pin_list]
    | -boundary_ports pin_list }
    [ -power_switchable_nets net_list |
    -ground_switchable_nets net_list]
    [ -shutoff_condition expression]
```

The options and their corresponding arguments of the create_power_domain command are shown as follows according to an embodiment of the present invention.

-boundary_ports pin_list: This option and its argument specify the list inputs and outputs that are considered part of this domain. Specifically, for inputs and outputs of the top-level design, it specifies ports. For inputs and outputs of instances of a timing model in the library, it specifies a list of the instance pins that are part of the domain. If this option is not specified with the -instances option, the power domain is considered to be a virtual power domain. A virtual domain allows a designer to describe the associations of the inputs and outputs of an existing instance block or a not-yet designed instance block with power domains.

-default: This option identifies the specified domain as the default power domain. All instances of the design that are not associated with a specific power domain belong to the default power domain. This is also the power domain that is referenced when information for calculating delays of a specific condition of a design is created.

-ground_switchable_nets net_list: This option and its argument identify the ground nets that connect the GROUND pins of the gates and the switch that controls the power shut-off. The specified nets will be considered as global ground nets. A designer may specify this option when the path from power to ground is cut off on the ground side (i.e., use a footer cell).

-instances instance_list: This option and its argument specify the names of all instances that belong to the specified power domain. If this option is specified together with the -io_ports option, it indicates that for any connection between a specified port and any instance inside the power domain, no special interface logic for power management is required.

-name power_domain: This option and its argument specify a name of a power domain.

-power_switchable_nets net_list: This option and its argument identify the power nets that connect the POWER pins of the gates and the switch that controls the power shut-off. The specified nets are considered as global power nets. A designer may specify this option when the path from power to ground is cut off on the power side (i.e., use a header cell).

-shutoff_condition expression: This option and its argument specify a condition when a power domain is shut off. The condition is a Boolean function of the pins. In the default mode, the power domain is on.

The example below illustrates the uses of the create_power_domain command. It assumes a design with the hierarchy Top ->INST1->INST2. In this example, the following two sets of CPF commands are equivalent:

a. create_power_domain -name PD1 -instances INST1
   create_power_domain -name PD2 -instances INST1.INST2
b. create_power_domain -name PD2 -instances INST1.INST2
   create_power_domain -name PD1 -instances INST1

This illustrates that the order in which the designer specifies the target domains is irrelevant. The result is that instance INST1 belongs to power domain PD1 and instance INST2 belongs to power domain PD2. The following command associates a list of instances with power domain PD2.

create_power_domain -name PD2 -instances {A C
   I_ARM1 PAD1}

The create_state_retention_logic command is used to replace selected registers or all registers in the specified power domain with state retention flip-flops. By default, the appropriate state retention cells are chosen from the state retention cells defined with the define_state_retention_cell command or from the library based on the appropriate .lib attributes. An example use of the create_state_retention_logic command is shown below.

create_state_retention_logic
   { -power_domain power_domain | -instances instance_list }
   -restore_edge expression [ -save_edge expression ]
   [ -clock_gating_condition expression ]
   [ -cell_type string ]

The options and their corresponding arguments of the create_state_retention_logic command are shown as follows according to an embodiment of the present invention.

-cell_type string: This option and its argument specify the class of library cells that can be used to map designer-specified sequential elements such as flip-flops and latches. The specified string corresponds to the value of a power_gating_cell .lib attribute. If this option is not specified, the tool may automatically choose the state retention flip-flops from the library.

-clock_gating_condition expression: This option and its argument specify a condition when the clock of a state retention cell is gated so that the save or restore operation can be carried out. The condition is a function of the pins. Note that some technologies require the clock signal being stable before a save or restore operation can be carried out.

-instances instance_list: This option and its argument specify the names of the latches and flip_flops that a designer wants to replace with a state retention flip-flop. A designer may specify the names of the leaf instances. If the designer specifies the name of a hierarchical instance, all latches and flip-flops in this instance and its children that belong to the same power domain will be replaced. Note that the instances may belong to several power domains. If they belong to different power domains, the same conditions will be applied.

-power_domain power_domain: This option and its argument specify a name of a power domain containing the target flip_flops to be replaced. In this case, all flip-flops in this power domain are replaced. The power domain is previously defined with the create_power_domain command.

-restore_edge expression: This option and its argument specify a condition when the states of the sequential elements need to be restored. The expression is a function of pins. When the expression changes from false to true, the states are restored. During logical synthesis, the logic implementing the expression will be used to drive the restore pin of the state retention cells.

-save_edge expression: This option and its argument specify a condition when the states of the sequential elements need to be saved. The condition is a function of pins. When the expression changes from false to true, the states are saved. During logical synthesis, the logic implementing the expression will be used to drive the save pin of the state retention cells. The inverse of this option is the restore_edge option.

The set_array_naming_style command specifies a format for naming individual bits of instance arrays. Note that this command appears once in a CPF file. Also note that this command is not needed if the designer uses the same object names in CPF as in the design. This command is optional in a CPF file used by RTL compiler. If the designer wants to include the command in the CPF file used by RTL compiler, the specified string needs to match the value of the hdl_array_naming_style root attribute set in RTL compiler. If the CPF file is generated by RTL compiler, the string in this command will match the value of the hdl_array_naming_style root attribute in RTL compiler. An example use of the set_array_naming_style command is shown below. The String specifies the format for an individual bit of an instance array.

set_array_naming_style string

The set_hierarchy_separator command specifies the hierarchy delimiter character used in the CPF file. Note that this command appears once in the CPF file. The Character argument specifies the hierarchy delimiter character. An example use of the set_hierarchy_separator command is shown below.

set_hierarchy_separator character

The set_cpf_version command specifies the version of the format. The value argument specifies the version by using a string. An example use of the set_cpf_version command is shown below.

set_cpf_version 1.0

The set_register_naming_style command specifies the format used to print out flip-flops and latches in the netlist. Note that this command appears once in a CPF file. Also note that this command is not needed if the same object names in CPF as in the design are used. This command is optional in a CPF file used by RTL compiler. If a designer wants to include the command in the CPF file used by RTL compiler, he needs to ensure that the specified string matches the value of the hdl_reg_naming_style root attribute set in RTL compiler. If the CPF file is generated by RTL compiler, the string in this command will match the value of the hdl_reg_naming_style root attribute in RTL compiler. An example use of the set_register_naming_style is shown below. The string argument specifies the format used for flip-flops and latches in the netlist.

set_register_naming_style string

The set_scope command changes the current scope to the scope determined by the argument. Note that all objects referred to in the library cell-related CPF commands are scope insensitive, all design objects except for ground and power nets are scope sensitive, and all the expressions in the CPF design-related constraints are scope sensitive. An example use of the set_scope command is shown below.

set_scope {hier_instance [-merge_default_domains]|
      -top | -up}

The options and their corresponding arguments of the set_scope command are shown as follows according to an embodiment of the present invention.

-top: This option changes the scope to the top design. Note that when a hierarchical CPF file is used, the designer should avoid using this argument in a sourced CPF file. In this case, the command does not reset the scope to the scope of the module of the hierarchical instance to which the sourced CPF file applies, but to the design of the main CPF file.

-up: This option changes the scope to the immediate parent of the current scope. Note that if a designer uses this argument when the current scope is already the top design, an error message may be issued.

-hier_instance: This option changes the scope to the specified hierarchical instance. The instance is a valid hierarchical instance in the current scope.

-merge_default_domains: This option specifies whether to merge the default power domain of the current scope (when it is not the top design) with the default power domain of the top design. Note that this option may be specified in the context of hierarchical CPF.

The following example further illustrates the use of the set_scope command.

```
set_top_design A
set_scope B.C ; #changes the scope to B.C
create_isolation_logic -isolation_condition .enable -from PD1
# the previous command ues the enable signal at the top level to create
isolation
# logic at the output ports of power domain PD1
set_scope -up ; #changes the scope to B
set_scope -up ; #changes the scope to the parent of B, which is A or the
top
```

The set_top_design command specifies the name of the design to which the power information in the CPF file applies. Note that this command usually appears once in a CPF file. If it appears multiple times, the first one applies to the top design, while the subsequent ones follow a scope change using the set_scope command. An example use of the set_top_design command is shown below.

set_top_design design

The argument design specifies the name of the design to which the power information in the CPF file applies. It specifies the name of the top module in RTL. Note that when a designer uses a hierarchical CPF file, the design name corresponds to the module name of the current scope.

The following example further illustrates the use of the set_top_design command. In this case, the commands of the CPF file of the soft block are copied directly into the CPF file of the top design. Design B corresponds to the module name of instance i_B, which is the current scope.

```
set_top design top_chip
create_power_domain -name PD1 -instances C
create_power_domain -name Default -default
set_scope i_B
set_top_design B
create_power_domain -name Standby -instances DRAM -io_ports
{P1 P2} \
-shutoff_condition power_down
set_scope -top
create_isolation_logic-fromi_B.Standby-toPD1-
isolation_conditionstdby_signal
```

Figure 2B:
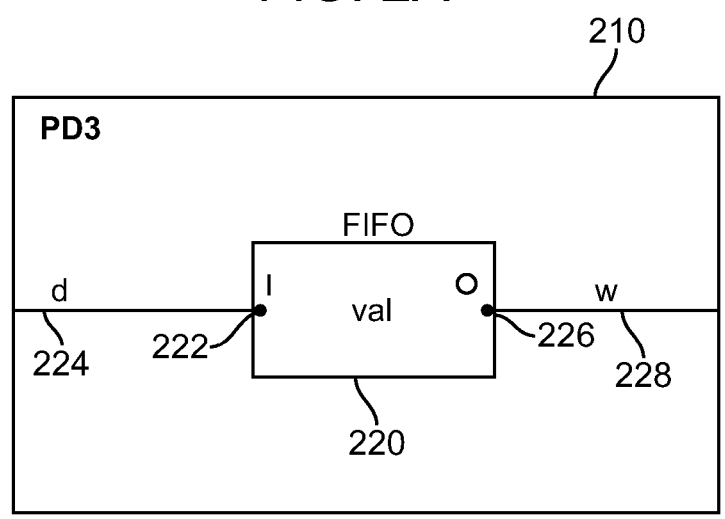
FIG. 2B illustrates a simplified example of a circuit instance in a power domain according to an embodiment of the present invention.

FIG. 2B illustrates a simplified example of a circuit instance in a power domain according to an embodiment of the present invention. This example shows an element of a six-bit register named val 220 in the power domain 3 (PD3) 210. The register val has an input port I 222 and an output port O 226. The input port I is connected to an external power domain through the net d 224, and the output port O is connected to an external power domain through the net w 228. Note that any given power domain may include one or more circuit instances such as val 220.

FIG. 2C illustrates a simulation result without cell isolation or state retention during a period when power is applied to the register of FIG. 2B. As shown in FIG. 2C, the simulation result is tabulated in three columns, namely time, register (value), port/net (value). In this example, the value of the net w 228 follows the corresponding value of the register val 220 as time progresses from 0 to 200. One skilled in the art would recognize that when no power is applied to the register, the value of the register val 220 and the net w 228 would be undefined.

Figure 2D:
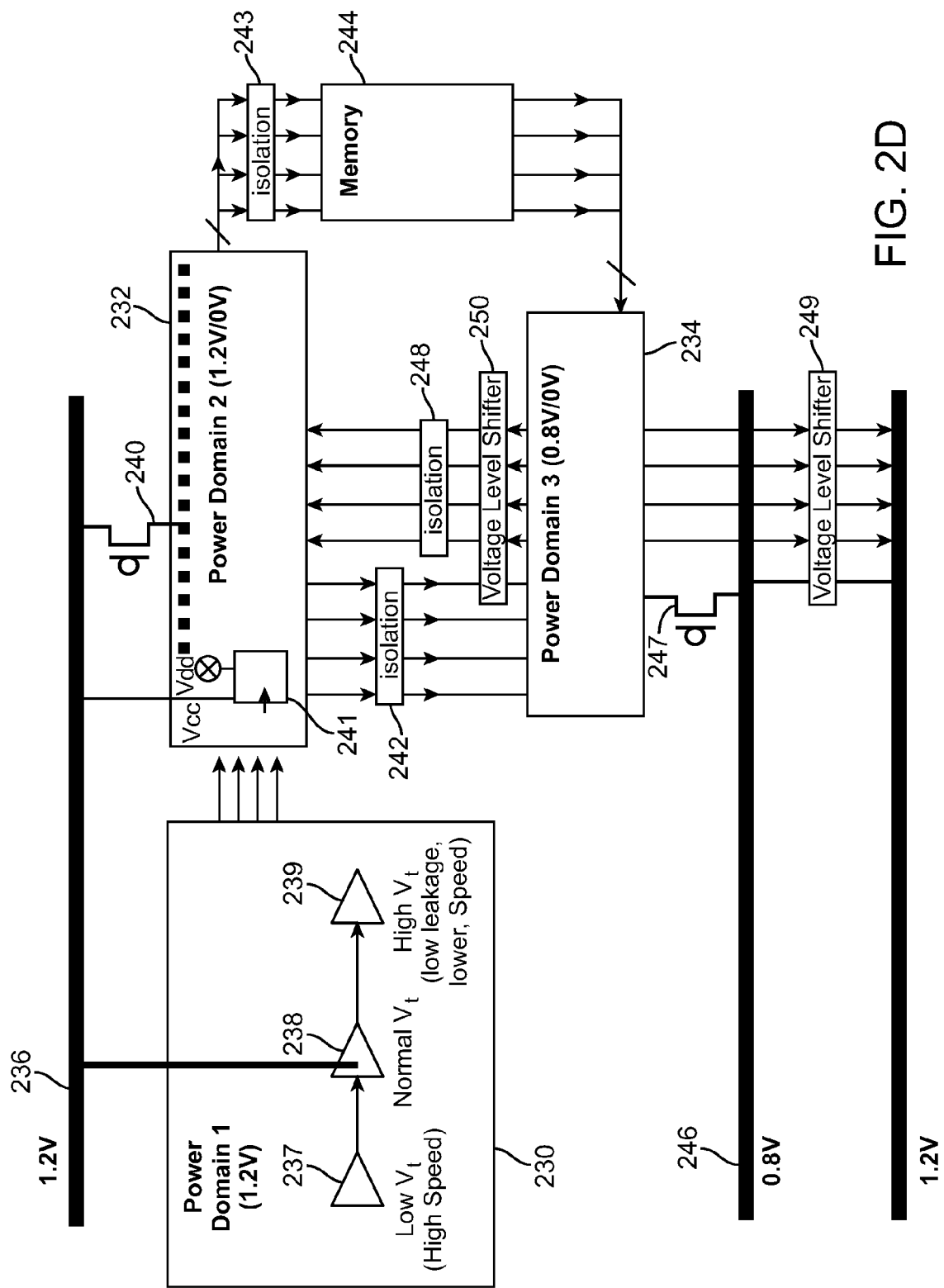
FIG. 2D illustrates an example design that can be used in conjunction with CPF according to an embodiment of the present invention.

FIG. 2D illustrates an example design that can be used in conjunction with CPF according to an embodiment of the present invention. CPF is used to track and maintain the power-related design intent, power-related power constraint, and power-related technology information for this design. This example design shows characteristics of advanced power management techniques which can be specified using CPF. Three power domains are shown: Power Domain 1 (230), Power Domain 2 (232), and Power Domain 3 (234).

Power Domain 1 (230) includes a collection of logic blocks that use the same power supply during normal operation. In this example, Power Domain 1 operates at 1.2V. Power Domain 1 is coupled to a power rail 236 operating at 1.2V. It is noted that a switch is not used to couple Power Domain 1 to the 1.2V power rail. As a result, Power Domain 1 is always "on," and cannot be turned off.

Power Domain 1 includes three cells having different operating parameters. A first cell 237 is associated with a low Vt, which provides operating characteristics of high speed and high leakage. A second cell 238 is associated with a normal Vt, which provides operating characteristics of normal speed and normal leakage. A third cell 239 is associated with a low Vt, which provides operating characteristics of low speed but also low leakage. Designers will attempt to balance the selection of these combinations of cells to achieve a desired set of performance characteristics with minimum leakage.

Power Domain 2 (232) also includes a set of logic blocks. Power Domain 2 can be powered on or off depending upon the particular power mode that is being employed. Therefore, Power Domain 1 can be at either 1.2V or 0V. In this example, a power switch 240 is used to power off or on the power domain.

Power Domain 2 contains a state retention power gating (SRPG) cell 241 to maintain state information during the periods of time in which the power domain is powered down. It can be seen that the SRPG cell 241 is separately coupled to the 1.2V power rail so that it can retain state even when the power switch has cut off power generally to the power domain.

Power Domain 2 is associated with appropriate isolation logic to ensure that inadvertent and unintended data is not propagated to other blocks when the power domain is powered down. For example, isolation logic 242 is used to connect Power Domain 2 to Power Domain 3. Similarly, isolation logic 243 is used to connect Power Domain 2 to a memory device 244.

Power Domain 3 (234) is a collection of logic blocks which all operate at 0.8V and the power domain is therefore connected to a power rail 246 at 0.8V. Power Domain 3 can be powered on or off depending upon the particular power mode that is being employed. Therefore, Power Domain 3 can be at either 0.8V or 0V. In this example, a power switch is used to power off or on the power domain.

Power Domain 3 is also associated with appropriate isolation logic 248 to ensure that inadvertent and unintended data is not propagated to other blocks when the power domain is powered down.

Voltage level shifters are used to interact with other blocks that operate at other voltage levels. For example, since Power Domain 2 operates at 1.2V and Power Domain 3 operates at 0.8V, voltage level shifters (249, 250) are used between these two power domains.

Figure 3A:
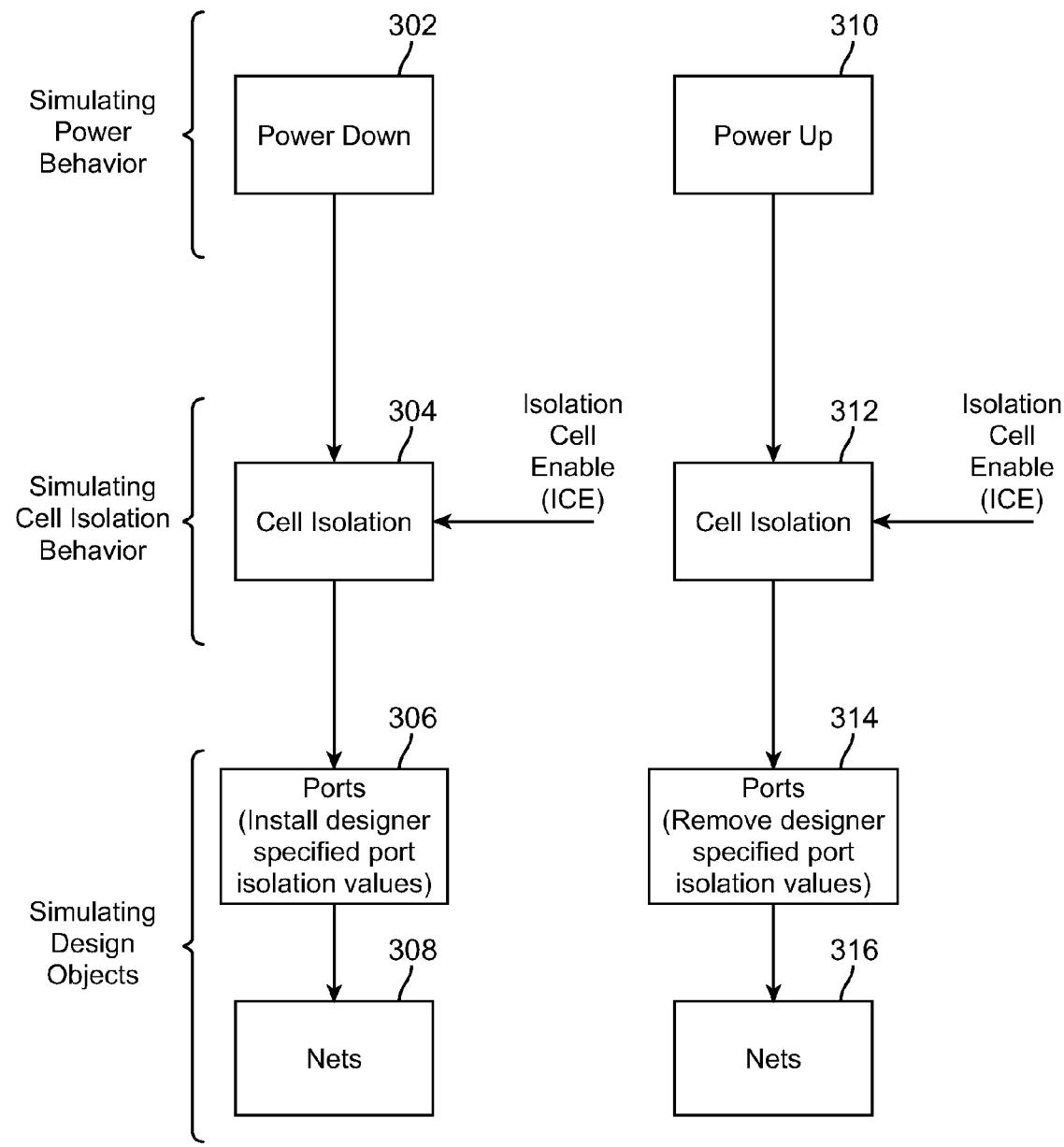
FIG. 3A illustrates a method for simulating isolation of a power domain according to an embodiment of the present invention.

FIG. 3A illustrates a method for simulating isolation of a power domain according to an embodiment of the present invention. The power behavior of a circuit under cell isolation conditions are simulated separately in a power-down process 302 and a power-up process 310 respectively. In a power-down process, the simulator examines the power control signal Isolation Cell Enable (ICE), which is also used in the disclosure in the lower case form as "ice," for determining whether to simulate the cell isolation behavior of the circuit. In response to the power control signal ICE, the simulator moves to step 306 for simulating relevant design object of the circuit. In particular, the simulator examines whether port isolation values are installed at the designer-specified ports. In step 308, the simulator examines whether the port isolation values are driven to the corresponding nets if the power control signal ICE is asserted (ice=1). If the power control signal ICE is not asserted (ice=0), the simulator would not display the above cell isolation behavior of the circuit during the power-down process.

On the other hand, in a power-up process 310, the simulator then examines the power control signal ICE for determining whether to simulate the cell isolation behavior of the circuit. In response to the power control signal ICE, the simulator moves to step 312 for simulating relevant design object of the circuit. In particular, the simulator examines whether port isolation values are removed from the designer-specified ports and the register values are driven to the ports in step 314. In step 316, the simulator examines whether the port values are driven to the corresponding nets if the ICE signal is asserted (ice=1). If the ICE signal is not asserted (ice=0), the simulator would not display the above cell isolation behavior of the circuit during the power-up process.

FIG. 3B illustrates a simulation result of the register of FIG. 2B with cell isolation in a power-down process according to an embodiment of the present invention. As shown in FIG. 3B, the simulation result is tabulated in four columns, namely time, power control signal, register (value), port/net (value). In this example, a step function is being recorded by the register val. The value of the net w follows the corresponding value of the register val when the power control signal ICE is not asserted (ice=0) during times 0 to 20, 77 to 120, and 153 to 200. However, when the power control signal ICE is asserted (ice=1) during times 25 to 70 and 125 to 150, the net w displays a designer-specified port isolation value, which is 111111 in this case. Note that even though the register value changes during times 25 to 70 and 125 to 150, the value of the net remains to be 111111, which is a designer-specified port isolation value.

Figure 4A:
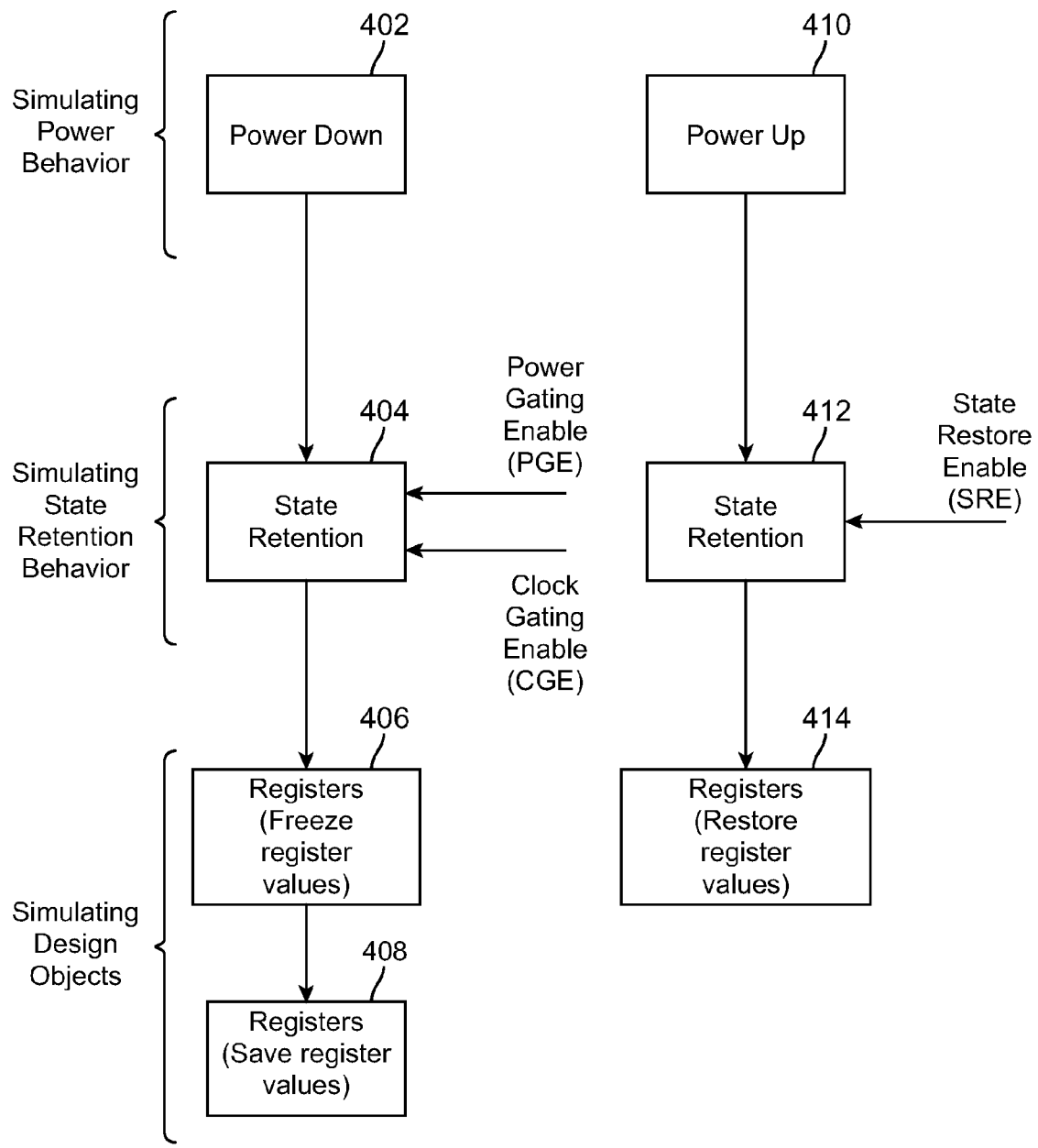
FIG. 4A illustrates a method for simulating state retention behavior according to an embodiment of the present invention.

FIG. 4A illustrates a method for simulating state retention behavior according to an embodiment of the present invention. The power behavior of a circuit under state retention conditions is simulated separately in a power-down process 402 and a power-up process 410 respectively. In a power-down process, the simulator examines the power control signals Power Gating Enable (PGE) and Clock Gating Enable (CGE), which are also used in the disclosure in the lower case form as "pge" and "cge" respectively, for determining the state retention behavior of the circuit in step 404. In response to the power control signals PGE and CGE, the simulator moves to step 406 for simulating relevant design object of the circuit. In particular, the simulator examines whether register value is frozen in step 406 if CGE is asserted (cge=1), since the clock applied to the register has stopped by the CGE signal. If the power control signal PGE is asserted, the simulator examines whether the register value is saved in step 408. On the other hand, if the CGE signal is not asserted, the simulator is expected to see that the register value would be updated in each clock cycle. And if the power control signal PGE is not asserted, the simulator is expected to see that the register value would not be saved or retained during a power-down process.

On the other hand, in a power-up process, the simulator examines the power control signal State Restore Enable (SRE), which is also used in the disclosure in the lower case form as "sre," for determining whether to simulate the state retention behavior of the circuit. If the power control signal SRE is asserted in step 412, the simulator moves to step 412 for simulating relevant design object of the circuit. In particular, the simulator examines whether register value is restored in step 414. If the power control signal SRE is not asserted, the simulator would not simulate the state retention behavior of the circuit during a power-up process.

FIG. 4B illustrates another simulation result of the register of FIG. 2B with state retention according to an embodiment of the present invention. As shown in FIG. 4B, the simulation result is tabulated in four columns, namely time, power control signal, register (value), port/net (value). In this example, when the power control signal PGE is asserted (pge=1) at time 26, the state of the register (val=000100) is retained, and this retained register value is restored to the register val when the power control signal PGE is not asserted (pge=0) at time 76. Similarly, when the power control signal PGE is asserted (pge=1) at time 126, the state of the register (val=001011) is retained, and this retained register value is restored to the register val when the power control signal PGE is not asserted (pge=0) at time 152.

Figure 5A:
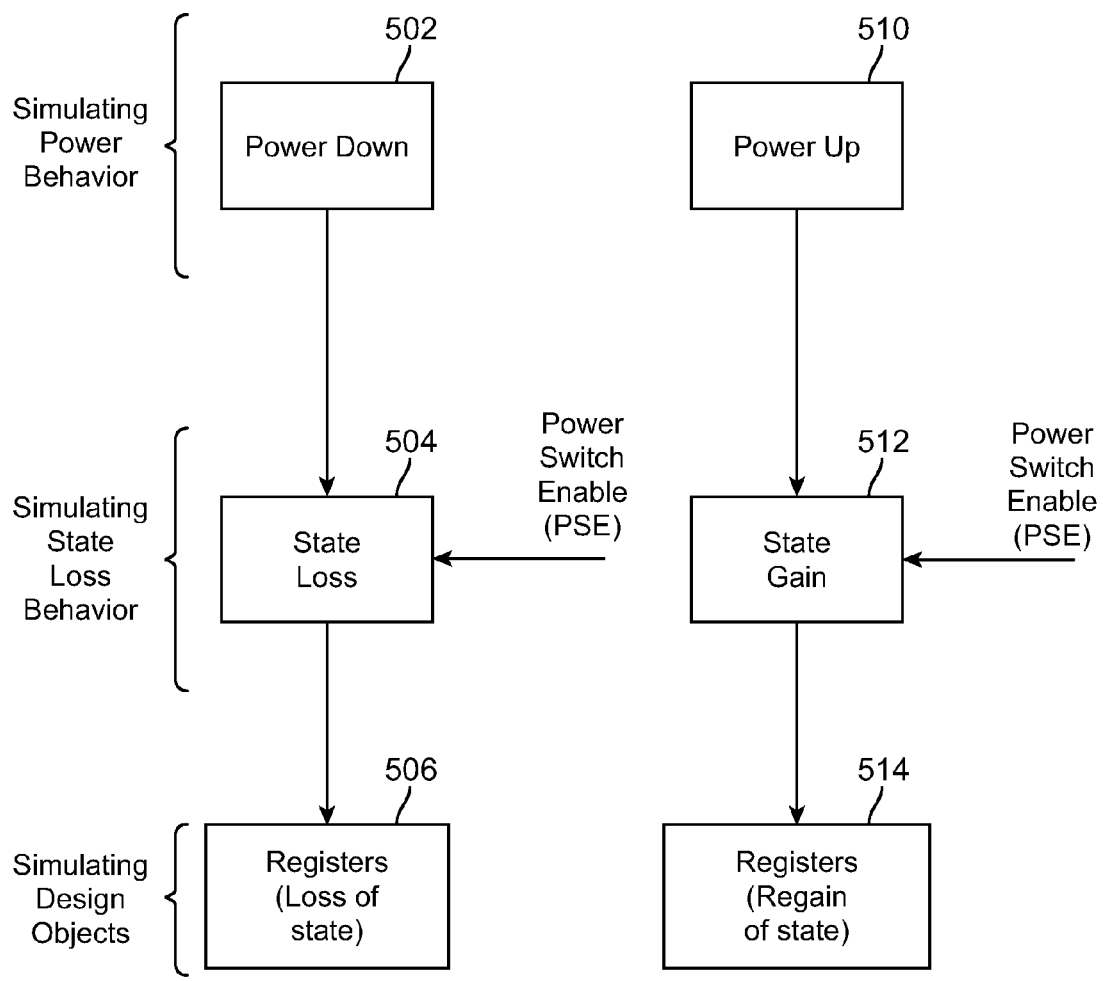
FIG. 5A illustrates a method for simulating state loss/gain behavior according to an embodiment of the present invention.

FIG. 5A illustrates a method for simulating state loss/gain behavior according to an embodiment of the present invention. The power behavior of a circuit under state loss/gain conditions is simulated separately in a power-down process 502 and a power-up process 510 respectively. In a power-down process, the simulator examines the power control signal Power Switch Enable (PSE) for determining the state loss behavior of the circuit in step 504. In response to the power control signal PSE, the simulator moves to step 506 for simulating relevant design object of the circuit. In particular, the simulator examines whether register value is lost in step 506.

On the other hand, in a power-up process, the simulator examines the power control signal Power Switch Enable (PSE) for determining whether to simulate the state gain behavior of the circuit. In response to the power control signal PSE received in step 512, the simulator moves to step 514 for simulating relevant design object of the circuit. In particular, the simulator examines whether the registers have regained their states in step 514.

FIG. 5B illustrates yet another simulation result of the register of FIG. 2B with state loss according to an embodiment of the present invention. As shown in FIG. 5B, the simulation result is tabulated in four columns, namely time, power control signal, register (value), port/net (value). In this example, when the power control signal PSE is asserted (pse=1) between times 0-20, the value of the register val and the corresponding value of the net w driven by val are valid. When the power control signal PSE is not asserted (pse=0), the value of the register becomes undefined (val=xxxxxx) and thus the value of the net w driven by val is also undefined (w=xxxxxx). Note that the cell isolation and state retention features are not enabled for this simulation. As a result, the power control signal PSE has no effect on the value of the register val and its corresponding net w from time 75 to 200. The value of the register val and the net w remain to be undefined (val=xxxxxx and w=xxxxxx).

FIG. 6A illustrates yet another simulation result of the register of FIG. 2B with cell isolation according to an embodiment of the present invention. As shown in FIG. 6A, the simulation result is tabulated in four columns, namely time, power control signal, register (value), port/net (value). In this example, from time 0 to 20, when the PSE signal is asserted and the ICE signal is not asserted, there is no cell isolation. The value of the net w follows the value of the register val. From time 25 to 75, the ICE signal is enabled, the value of the net w outputs a designer-specified value (w=111111). At time 27, when the PSE signal is not asserted, meaning the power is down, the value of the register becomes undefined (val=xxxxxx). From time 75 to 200, even after the PSE signal is asserted, the value of the register is still undefined (val=xxxxxx). This is because the simulation is run without the state retention feature. At time 77, when the ICE signal is not asserted (ice=0), the value of the net w is driven by the output of the register val and thus gets the undefined value (w=xxxxxx) of the register. From time 125 to 151, when the ICE signal is asserted again, the value of the net w outputs the designer-specified value (w=111111). Finally, when the ICE signal is not asserted, the value of the net w is again driven by the output of the register val and thus gets the undefined value (w=xxxxxx) of the register.

FIG. 6B illustrates another simulation result of the register of FIG. 2B with state retention capability enabled according to an embodiment of the present invention. As shown in FIG. 6B, the simulation result is tabulated in four columns, namely time, power control signal (including PSE, PGE, and ICE signals), register (value), port/net (value). In this example, a step function is being recorded by the register val. From time 0 to 20, the PSE signal is asserted, indicating power is on, and the value of the register is valid and is being updated. At time 26, when both the PSE and PGE signals are asserted, the value (state) of the register (val=000100) is retained. At time 27, when the PSE signal is not asserted, meaning the power is down, the value of the register becomes undefined (val=xxxxxx). At time 75, when PSE signal is asserted again, the retained value of the register is restored, which results in the value of the register (val=000100) at time 76. Similarly, at time 126, when both the PSE and PGE signals are asserted, the value (state) of the register (val=001011) is retained. At time 127, when the PSE signal is not asserted, meaning the power is down, the value of the register becomes undefined (val=xxxxxx). At time 151, when PSE signal is asserted again, the retained value of the register is restored, which results in the value of the register (val=001011) at time 152. There is no change in the power control signals PSE and PGE; the step function continues to increase from time 153 to 200.

FIG. 6C illustrates yet another simulation result of the register of FIG. 2B with cell isolation and state retention capability enabled according to an embodiment of the present invention. As shown in FIG. 6C, the simulation result is tabulated in four columns, namely time, power control signal (including PSE, PGE, and ICE signals), register (value), port/net (value). In this example, a step function is being recorded by the register val. From time 0 to 25, the PSE signal is asserted, i.e., power is on, the value of the register is valid and is being updated. At time 26, when both the PSE and PGE signals are asserted, the value (state) of the register (val=000100) is retained. At time 27, when the PSE signal is not asserted, meaning the power is down, the value of the register becomes undefined (val=xxxxxx). At time 75, when PSE signal is asserted again, the retained value of the register is restored, which results in the value of the register (val=000100) at time 76. Similarly, at time 126, when both the PSE and PGE signals are asserted, the value (state) of the register (val=001011) is retained. At time 127, when the PSE signal is not asserted, meaning the power is down, the value of the register becomes undefined (val=xxxxxx). At time 151, when PSE signal is asserted again, the retained value of the register is restored, which results in the value of the register (val=001011) at time 152. There is no change in the power control signals PSE and PGE; the step function continues to increase between time 153 to 200.

Referring to the cell isolation behavior of the simulation, from time 0 to 20, 77 to 120, and 153 to 200, when the ICE signal is not asserted, the value of the net w follows the value of the register val. However, when the ICE signal is asserted, indicating the cell isolation feature is enabled, the value of the net w outputs a designer-specified value, regardless of what the value of the register is. From time 25 to 76 and 125 to 152, the value of the net w outputs the designer-specified value (w=111111).

The benefit of providing power information specifications in the RTL level through electronic design automation tools disclosed herein will address the growing power management challenges faced by integrated circuit designers. The disclosed methodology enables functional verification of power designs early in the design process. It facilitates power verification of a gate-level netlist having low-power cells inserted. In addition, it automates runtime insertion of power behaviors to an existing or legacy design during simulation without modifying the design. As a result, the disclosed methodology brings productivity gains and improved quality circuit designs without making changes to the legacy RTL designs.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as are suited to the particular use contemplated.

What is claimed is:

1. A method for simulating a circuit, comprising:
   receiving a netlist description of the circuit, wherein the netlist description is represented in a register-transfer-level (RTL) design environment;
   receiving power information specifications of the circuit;
   identifying one or more power domains of the circuit using the netlist description and the power information specifications;
   associating the one or more power domains and the power information specifications in the RTL design environment, wherein the one or more power domains are controlled by a set of power control signals through a power manager logic; and
   using a computer for simulating state retention behavior in response to variations in power applied to a power domain wherein simulating state retention behavior includes:
   stopping a clock signal that controls sequential elements in the power domain in response to a clock gating signal being asserted;
   freezing values of the sequential elements in the power domain; and
   storing the values of the sequential elements.

2. The method of claim 1, wherein identifying one or more power domains comprises:
   specifying a list of input pins and output pins belonging to the power domain; and
   specifying names of instances belonging to the power domain.

3. The method of claim 2, further comprising:
   specifying ground nets for connecting ground pins of the power domain; and
   specifying power nets for connecting power pins of the power domain.

4. The method of claim 2, further comprising:
   specifying conditions for the power domain to be turned on/off and
   specifying a switch for controlling power on/off of the power domain.

5. The method of claim 1, wherein simulating state retention behavior further comprises:
   restoring values of sequential elements in response to a state restore enable signal being asserted when the power applied is turned on.

6. The method of claim 1, further comprising:
   simulating state loss behavior in response to power applied to the power domain being turned off.

7. The method of claim 6, wherein simulating state loss behavior comprises:
   in response to a power switch enable signal being asserted and power being turned off, driving user-specified state loss values to sequential elements in the power domain.

8. The method of claim 1, further comprising:
   simulating state gain behavior of the power domain in response to power applied to the power domain being turned on.

9. The method of claim 8, wherein simulating state gain behavior comprises:
   in response to a power switch enable signal not being asserted and power being turned on, removing previously driven user-specified state loss values from corresponding sequential elements in the power domain.

10. The method of claim 1, wherein simulating state retention behavior further comprises:
    specifying a class of library cells for mapping existing sequential elements of the power domain; and
    specifying names of the existing sequential elements to be replaced with corresponding state retention sequential elements.

11. The method of claim 10, further comprising:
    specifying conditions for when a clock of a state retention sequential element is gated for carrying out a save operation; and
    specifying conditions for when a clock of a state retention sequential element is gated for carrying out a restore operation.

12. The method of claim 10, further comprising:
    specifying conditions for state retention sequential elements to be saved; and
    specifying conditions for state retention sequential elements to be restored.

13. The method of claim 1, wherein power information specifications of the circuit comprises at least one of power-related design intents, power-related constraints, and power-related technology information.

14. The method of claim 1, wherein the one or more power domains are described in a hierarchical simulation data structure.

15. The method of claim 1, wherein the one or more power domains include a plurality of power domains with separate power control signals for controlling power variations in separate portions of the circuit.

16. A computer program product for simulating a circuit, comprising a medium storing computer programs for execution by one or more computer systems having at least a processing unit, a user interface and a memory, the computer program product comprising:
    code for receiving a netlist description of the circuit, wherein the netlist description is represented in a register-transfer-level (RTL) design environment;
    code for receiving power information specifications of the circuit;

code for identifying one or more power domains of the circuit using the netlist description and the power information specifications;

code for associating the one or more power domains and the power information specifications in the RTL design environment, wherein the one or more power domains are controlled by a set of power control signals through a power manager logic; and code for simulating state retention behavior in response to variations in power applied to a power domain, wherein the code for simulating state retention behavior includes:

code for stopping a clock signal that controls sequential elements in the power domain in response to a clock gating signal being asserted;

code for freezing values of the sequential elements in the power domain; and code for storing the values of the sequential elements.

17. The computer program product of claim 16, wherein the code for identifying one or more power domains comprises:

code for specifying a list of input pins and output pins belonging to the power domain; and code for specifying names of instances belonging to the power domain.

18. The computer program product of claim 17, further comprising:

code for specifying ground nets for connecting ground pins of the power domain; and code for specifying power nets for connecting power pins of the power domain.

19. The computer program product of claim 17, further comprising:

code for specifying conditions for the power domain to be turned on/off; and code for specifying a switch for controlling power on/off of the power domain.

20. The computer program product of claim 16, wherein the code for simulating state retention behavior further comprises:

code for restoring values of sequential elements in response to a state restore enable signal being asserted when the power applied is turned on.

21. The computer program product of claim 16, further comprising:

code for simulating state loss behavior in response to power applied to the power domain being turned off.

22. The computer program product of claim 21, wherein the code for simulating state loss behavior comprises:

code for driving user-specified state loss values to sequential elements in the power domain in response to a power switch enable signal being asserted and power being turned off.

23. The computer program product of claim 16, further comprising:

code for simulating state gain behavior of the power domain in response to power applied to the power domain being turned on.

24. The computer program product of claim 23, wherein the code for simulating state gain behavior comprises:

code for removing previously driven user-specified state loss values from corresponding sequential elements in the power domain in response to a power switch enable signal not being asserted and power being turned on.

25. The computer program product of claim 16, wherein the code for simulating state retention behavior further comprises:

code for specifying a class of library cells for mapping existing sequential elements of the power domain; and code for specifying names of the existing sequential elements to be replaced with corresponding state retention sequential elements.

26. The computer program product of claim 25, further comprising:

code for specifying conditions for when a clock of a state retention sequential element is gated for carrying out a save operation; and code for specifying conditions for when a clock of a state retention sequential element is gated for carrying out a restore operation.

27. The computer program product of claim 25, further comprising:

code for specifying conditions for state retention sequential elements to be saved; and code for specifying conditions for state retention sequential elements to be restored.

28. The computer program product of claim 16, wherein power information specifications of the circuit comprises at least one of power-related design intents, power-related constraints, and power-related technology information.

29. The computer program product of claim 16, wherein the one or more power domains are described in a hierarchical simulation data structure.

30. The computer program product of claim 16, wherein the one or more power domains include a plurality of power domains with separate power control signals for controlling power variations in separate portions of the circuit.

31. A computer system for simulating a circuit, the computer system including a processor with memory and a computer-readable medium storing computer programs for execution by the computer system, the computer programs comprising:

code for receiving a netlist description of the circuit, wherein the netlist description is represented in a register-transfer-level (RTL) design environment;

code for receiving power information specifications of the circuit;

code for identifying one or more power domains of the circuit using the netlist description and the power information specifications;

code for associating the one or more power domains and the power information specifications in the RTL design environment, wherein the one or more power domains are controlled by a set of power control signals through a power manager logic; and code for simulating state retention behavior in response to variations in power applied to a power domain, wherein the code for simulating state retention behavior includes:

code for stopping a clock signal that controls sequential elements in the power domain in response to a clock gating signal being asserted;

code for freezing values of the sequential elements in the power domain; and code for storing the values of the sequential elements.

32. The computer system of claim 31, wherein the computer programs further include code for simulating state loss behavior in response to power applied to the power domain being turned off, wherein the code for simulating state loss behavior comprises:

code for driving user-specified state loss values to sequential elements in the power domain in response to a power switch enable signal being asserted and power being turned off.

* * * * *